United States Patent Office 3,243,302
Patented Mar. 29, 1966

3,243,302
HIGH FAT FOOD PRODUCTS AND METHODS OF PREPARING SAME
Daniel Melnick, West Englewood, N.J., assignor to Corn Products Company, New York, N.Y., a corporation of Delaware
No Drawing. Filed May 22, 1963, Ser. No. 282,210
12 Claims. (Cl. 99—163)

This application is a continuation-in-part of my copending application Ser. No. 731,115, filed April 28, 1958, now abandoned.

This invention relates to foods having increased shelf life and to methods of improving the flavor stability of food products. More particularly this invention is directed to improving the shelf life of salt-flavored foods having a high fat content and to processes for improving the flavor stability of these food products.

Foods high in fat content, i.e. foods having a fat content in excess of about 15% such as margarine which is about 80% fat, peanut butter which is about 50% fat, potato chips which are about 40% fat, sausage and liverwurst which are about 20% fat etc., lose flavor upon standing. Foods high in fat content are known to have a shelf life much less than other type foods, the reason being that fatty foods are subject to oxidation thereby causing rancidity and other off-flavors to develop. Enormous amounts of time and money have been spent in efforts to find and eliminate or at least modify the factors responsible for the development of off-flavors in fatty foods. Fatty foods are in many instances maintained under refrigeration from the time they are manufactured in the processor's plant until the time they are used by the consumer. Other fatty foods while not refrigerated are processed in various manners such as by hydrogenation or by the addition of various inhibitors in efforts to increase the shelf life of these products and retard rancidity.

I have discovered that one of the primary causes responsible for the development of off-flavors and relatively poor shelf life of foods high in fat content is due to the presence of pro-oxidants such as iron and copper present in the salt incorporated in these foods. Common salt or sodium chloride is not produced in the pure state. Regardless of either the source of this material or the commercial method by which it is manufactured, the final product always contains trace quantities of salts of metals such as iron and copper. This is recognized by the Americal Chemical Society in specifying that its reagent grade of sodium chloride have an iron content of not more than two p.p.m. Salt manufacturers are presently selling to the food industry a quality salt product which is said to contain about one p.p.m. of iron. Nevertheless food products such as margarine, peanut butter, etc. containing even this high grade food quality salt are subject to loss of flavor. I have obtained experimental evidence showing that in spite of the low quantities of contaminants in premium grade salts, loss of flavor is significant. This effect has been seen in margarines which usually contain about 2.7% by weight of common salt, 80% fat and the remainder skimmed milk. Such margarines when containing common salt have a flavor life which is less than one-half of that obtained with margarines free of common salt, provided the latter do not exhibit microbiological spoilage. By eliminating the milk solids from the formulations to provide "water" margarines, microbiological spoilage may be substantially reduced. Thus the modified water margarines provide excellent test systems for evaluating the pro-oxidant tendencies of common salt dissolved in the aqueous phase.

When margarine oil is stored under air in a loosely capped jar at 80° F., a period of about two weeks is required before flavor deterioration is evident. No change in flavor life can be detected when about 20% water is added to the margarine oil. On the other hand, the addition of 2.7% of common salt or food grade salt to the aqueous phase of the margarine causes flavor defects to appear at about the third day of storage, and at the end of one week, the flavor of the margarine is repulsive. It was surprising to find that it was the pro-oxidant metal contaminants of salt which were responsible for this flavor deterioration. It has been common knowledge in the margarine industry for many years that margarine is a product which is subject to considerable flavor instability and numerous attempts have been made by the industry to discover the cause of this flavor instability. However, the industry has failed to appreciate that the minute quantities of pro-oxidant metals present in premium grade salt are the factors responsible for this flavor deterioration. The reason is that salt normally only constitutes about 1–4% of the total margarine and that the trace metals in the salt which are responsible at least in part for the flavor instability are present in amounts of about 0.01 to about 0.08 p.p.m. of the overall margarine content. Thus it is not surprising that the industry has failed to appreciate the fact that it is these minute quantities of pro-oxidant metals present in the premium grade salt which are responsible for the flavor instability rather than the other ingredients of margarine present in much greater amounts. The margarine industry has even gone so far as to recommend to the Quartermaster Corps of the Army that the milk solids be eliminated from the canned margarine for the Armed Forces in an attempt to improve the stability of this margarine. Other food industries have relied upon the addition of anti-oxidants, such as butylated hydroxyanisole to extend the shelf life of their products, viz. salted potato chips.

It is therefore an object of the invention to provide salt-flavored foods high in fat content having improved flavor stability. It is a further object of this invention to improve the flavor and shelf life of such foods having a fat content in excess of about 15%. It is another object of this invention to provide margarines, peanut butters, potato chips, meat products, containing food grade salts from which the pro-oxidant metals have either been entirely removed or else rendered innocuous. It is a still further object of this invention to provide processes for improving the shelf life of salt-flavored foods having a high fat content. It is a still further object of this invention to provide processes for the manufacture of margarines, peanut butters, potato chips, meat products and other food products having a fat content in excess of about 15% in which the pro-oxidant metals normally present in the food grade salt incorporated in these products have been either entirely removed or else rendered innocuous. Other objects and advantages of this invention will become apparent from the following detailed description and examples.

According to this invention, there are provided food products having a fat content of at least 15% and having present therein sodium chloride which had been recrystallized from a brine that contained in solution about 50 to 5,000 p.p.m. of an alkylenediaminetetracarboxylic acid compound, the concentration of which is expressed on the dry weight of the salt, said sodium chloride being free of metals having pro-oxidant tendencies.

I have found that high fat food products which have incorporated therein sodium chloride which has been treated with an alkylenediaminetetracarboxylic acid compound in a manner to be described in greater detail hereinafter, have enhanced shelf life and retain their flavor stability to a much greater extent than food products containing the premium food grade quality salt presently available on the market. The reference salts employed in the present investigation were premium food grade salts containing unavoidably and regularly trace quantities of a copper salt or an iron salt as contaminants. In my process, the sodium chloride containing iron and copper contaminants is treated in an aqueous solution with a chelating agent of an alkylenediaminetetracarboxylic acid compound which combines with the metal contaminants present in the salt. Sodium chloride is then recrystallized from the resulting medium to produce solid sodium chloride essentially free of pro-oxidant metals and a mother liquor containing the excess chelating agent as well as that combined with metal contaminants. The pro-oxidant metals are believed to be present initially as inorganic salts in the brine (sodium chloride solution). The exact nature of these salts is not known but the quantities of these metals in common salt are small, for example, from about 0.2 to 20 p.p.m. Actually the amount of metal contaminants may be greater or smaller than the range just given as far as the purposes of this invention are concerned.

In purifying the salt, sodium chloride containing the pro-oxidant metals is completely dissolved in water and this is usually accomplished at elevated temperature which is below the level at which the liquid medium becomes gaseous. The quantity of water solvent is regulated to assure complete solution of the common salt, otherwise not all of the metal pro-oxidants present as contaminants in the salt are reacted with the chelating agent. Excessive quantities of water for the reaction are avoided to reduce the cost of evaporating the water solvent for the subsequent crystallization step. In general about 100 parts by weight of water are added to solubilize 20 to 39 parts by weight of common salt, the resulting solutions being equivalent to 17–28% by weight of sodium chloride in water.

The chelating agent is added to the aqueous solution of common salt in an amount which is at least sufficient to react with all of the metal contaminants. Usually, about 50 to 5,000 p.p.m. of chelating agent expressed on the dry weight of the common salt are employed. It is advisable to use an excess of chelating agent to assure complete reaction; the presence of unreacted chelating agent in the reaction medium has no effect on the purity of the crystallized salt recovered as such. The temperature at which the chelating agent reacts with the metal contaminants is not important, provided the aqueous phase is still liquid. The reaction temperature for convenience coincides preferably with the temperature at which contaminated sodium chloride is solubilized in water or as is in process of conventional purification and concentration.

The chelating agent is an alkylenediaminetetracarboxylic acid or salt thereof in which the alkylene group is ethylene or propylene, the carboxylic acid group is the acetic or propionic acid group, and the metal cation of the salt is edible and can be sodium, potassium or calcium, or mixtures of two or three of the cations. Specific examples of the chelating agent are ethylenediaminetetraacetic acid, ethylenediaminetetrapropionic acid, ethylenediaminediaceticpropionic acid, tetrasodium ethylenediaminetetraacetate calcium disodium ethylenediaminetetraacetate, etc. The above-named chelating agents are water soluble to a sufficient degree to facilitate the reaction with the metal contaminants in aqueous medium. Generally, the chelating agent has a solubility of about 0.03 to 103 grams per 100 ml. of water at 26° C. (78.8° F.). It should be understood that the expression "alkylenediaminetetracarboxylic acid compound" as used in this specification and claims designates generically the above acids and salts which can be used as chelating agents.

The solution of brine in which the contaminants are reacted with the chelating agent may be adjusted in alkalinity to provide a pH of about 8 to 12 by means of an edible alkaline reagent such as sodium or potassium hydroxide, carbonate, or bicarbonate. It was found that the use of such high pH values is advantageous because the resulting salt product has less of an adverse effect on food flavor.

After the metal contaminant has been reacted with the chelating agent, and this is almost instantaneous, the entire solution is subjected to a crystallization treatment. Sodium chloride is made to crystallize from solution by first evaporating about 25 to 95% by weight of the solvent, water, and then cooling the suspension, if desired, to a temperature of about 35 to 95° F. The extent of evaporation is usually kept below about 95% by weight of water removed, based on the initial water content, otherwise there is a tendency for the crystals of sodium chloride to become contaminated with combined and/or uncombined chelating agent. It may be also desirable to effect crystallization in several stages. In the first stage, about 25 to 85% by weight of water may be removed, and in the second stage, additional water may be evaporated until a total of up to about 95% is removed.

Several analytical procedures may be used for determining the trace amounts of combined or uncombined chelating agent and metal contaminants. Free or uncombined alkylenediaminetetracarboxylic acid compound can be determined by the colorimetric method described by A. Darbey, Analytical Chemistry, volume 24, page 373 (1952).

The concentrations of metal contaminants are determined colorimetrically. Iron analysis is made by the procedure described in Methods of Analysis, Association of Official Agricultural Chemists, 8th Edition, pp. 208–209 (1955). The copper analysis is conducted by the method described on page 110 of the Methods of Analysis given above. Iron or copper which is combined with the chelating agent must first be liberated for analytical test. The chelate is first decomposed and then use made of one of the procedures given above. Decomposition of the chelate is effected by wet digestion with concentrated sulphuric acid. 20 grams of processed salt containing the chelated metal contaminants are placed in a Vycor crucible and to the crucible are added 10 ml. of water and 2.5 ml. of concentrated sulphuric acid. The mixture is stirred and then heated until sulphuric acid fumes are noted. The crucible is cooled and the contents then employed in the analyses for iron or copper.

I have found that treatment of salt with a chelating agent in the manner described above, completely removes the pro-oxidant metals from the salt and any which escape removal are no longer pro-oxidant. In many instances, the pro-oxidant metals are substantially completely removed from the salt, at least insofar as can be determined by the analytical procedures referred to above. When employing the procedures mentioned above, the salts have in many instances been found to be completely free not only of the pro-oxidant metals found in the salts, but also free of the chelating agent used to remove the pro-oxidant metals from the salt. In other instances, I have found that while the salt which has been treated with the chelating agent may still contain minute amounts of the pro-oxidant metals, the pro-oxidant tendencies of the metals have been eliminated so they no longer interfere with the flavor stability and shelf life of foods high in fat content. In virtually all instances, the chelating agent is not present to any measurable degree in the purified salt. This of course is a decided advantage in that the salt does not contain any chemical additive and consequently eliminates any labeling problems.

The common salt which has been treated in the manner aforedescribed has many uses in the food industry. The treated common salt can be added to food products including the example meat sausages, cured and smoked hams or bacons, peanut butter, potato chips, or any other salt-flavored foods which contain fats and oils in excess of 15%. Surprisingly, peanut butter and potato chips have longer flavor life when salt processed in the manner described above is employed than they have with salt to which an alkylenediaminetetracarboxylic acid component has been added. The quantity of salt to be employed in these foods is of course well known to those skilled in the art. A particularly desirable application for the salts treated in the manner aforedescribed is in foods containing about 10–70% by weight of water such as for example, margarine containing skimmed milk. Margarines contain from about 80–82% by weight of fat, about 1–4% common salt and the remainder (adding up to 100% on a weight basis) being skimmed milk. The marked extension of improvement in flavor life of foods containing water (viz. a doubling of the shelf life) is unexpected. Other water containing foods are for example sausages and related products such as pork sausages, bologna, frankfurters and liverwurst, cured and smoked meats such as ham and bacon, and cheeses, such as cheddar, cream and Swiss.

To provide a better understading of this invention, reference should now be had to the following specific examples:

EXAMPLE I 100 p.p.m. of ethylenediaminetetraacetic acid (EDTA) were added to a 20% by weight of an aqueous solution of food-grade sodium chloride containing 1.0 p.p.m. of iron and 0.15 p.p.m. of copper, or 500 p.p.m. of EDTA expressed on the basis of weight of salt. The solution had a pH of 4.5. After holding the brine solution at 200° F. in an open vessel for about 10 hours, 50% of the water was evaporated off. The brine slurry was chilled to 45° F. and held at that temperature for about 12 hours. The supernatant salt solution was decanted off. The first batch of sodium chloride crystals, 30% of the initial amount of sodium chloride, was obtained by vacuum-filtration and then air-dehydration while the salt was still on the filter. Neither EDTA, copper, nor iron in the free or chelated forms could be detected in the salt product.

The mother liquor was a saturated salt solution, containing 26% by weight of sodium chloride. It contained EDTA and the EDTA-chelated pro-oxidant metals. The mother liquor was concentrated as described above for 6 hours at 200° F., resulting in the evaporation of 20% more of the initial water. Sodium chloride was crystallized as described above, yielding a second batch which amounts to 29% more of the initial amount of sodium chloride. The sodium chloride crystals were free of detectable EDTA and of pro-oxidant metal salts in the free or chelated forms.

Following the procedure described above, a third batch of sodium chloride crystals was produced, amounting to 18% of the initial amount of sodium chloride. To obtain the salt, 13% further loss of water by evaporation at 200° F. was required. The sodium chloride was free of detectable EDTA and of pro-oxidant metals in the free or chelated forms.

The remaining mother liquor containing 23% of the original sodium chloride, EDTA and EDTA-chelated pro-oxidant metals was discarded.

EXAMPLE II

The tetrasodium salt of EDTA was added in the quantity of 500 p.p.m. expressed as EDTA on the weight of salt to a 20% by weight of an aqueous solution of food-grade sodium chloride containing 1.2 p.p.m. of iron and 0.12 p.p.m. of copper. The pH of the solution was 6.0. The brine was concentrated by distillation, at atmospheric pressure, of the water until 60% of the water was evaporated off. The brine slurry was chilled to 45° F. and held at this temperature for about 12 hours. The supernatant salt solution was decanted, and the batch of sodium chloride crystals, obtained by vacuum-filtration, was air-dried while still on the filter. The sodium chloride crystals (43% yield) were free of detectable EDTA and of pro-oxidant metals in the free or chelated forms. The latter were found in the mother liquor, which was discarded.

EXAMPLE III

The tetrasodium salt of EDTA was added in the quantity of 500 p.p.m. expressed as EDTA on the weight of salt to a 20% by weight of an aqueous solution of sodium chloride containing 1.2 p.p.m. of iron and 0.12 p.p.m. of copper. The pH of the brine was adjusted to 10.0 by means of sodium hydroxide addition. The brine was concentrated by distillation, at atmospheric pressure, of the water until 60% of the water was evaporated off. The brine slurry was chilled to 45° F. and held at this temperature for about 12 hours. The supernatant salt solution was decanted. The first batch of sodium chloride crystals was obtained by vacuum-filtration and then air-dried while still on the filter. The sodium chloride product (43% yield) was free of detectable EDTA salt and of pro-oxidant metals in the free or chelated forms.

The mother liquor from the crystallization step was subjected to further concentration by distillation of the water under conditions similar to those above to provide a second batch of sodium chloride crystals. 32% more of the initial water content had now been removed. The second batch of sodium chloride accounted for an additional 46% of the original sodium chloride. The sodium chloride was free of detectable EDTA salt and of pro-oxidant metals in the free or chelated forms.

The total yield of sodium chloride was 89% based on the starting material. The residual mother liquor, containing the unreacted tetrasodium salt of EDTA and the EDTA-chelated pro-oxidant metals, was discarded.

EXAMPLE IV

The tetrasodium salt of EDTA was added in the quantity of 5000 p.p.m. expressed as EDTA on the weight of salt to a 26% by weight aqueous solution of crude sodium chloride containing 10.4 p.p.m. of iron and 1.3 p.p.m. of copper. The pH of the brine was adjusted with an alkaline (NaOH) solution to 10.0. The brine was concentrated by distillation at atmospheric pressure of the water until 85% of the water was evaporated off. The brine slurry was chilled to 45° F. and held at this temperature for about 30 hours. The supernatant salt solution was separated and the first batch of sodium chloride crystals (85% yield) was obtained by filtration and air-drying. The soduim chloride was free of detectable EDTA salt and of trace metals having pro-oxidant activity. On analysis for chelated trace metals, a positive test was obtained.

The mother liquor containing free EDTA salt and EDTA-chelated pro-oxidant metals was concentrated further by evaporation of water to near dryness. The residual mother liquor amounted in weight to only 3% of the starting brine. The second batch of sodium chloride (12% in overall yield) contained detectable free EDTA salt. These sodium chloride crystals were discarded with the residual mother liquor.

The treated common salts of the various examples were evaluated by addition to a margarine containing 80% fat, 2.7% common salt and the remainder water. The margarines were stored under air at 80° F. in half-filled loosely capped jars. Flavor was evaluated at various times and the results are given in Table I below:

Table I

[Flavor stability of "Water" margarines made with 2.7% of the salts of the present invention]

| Test | Material | Flavor [1] of Margarine under Air at 80° F. | | |
|---|---|---|---|---|
| | | 0 Days | 3 Days | 8 Days |
| Control: | Commercial Salt (NaCl) of food-grade quality | G | F-P | VP |
| Example I | (a) First batch of NaCl | G | F-FG | F-P |
| | (b) Second batch of NaCl | G | F-FG | F-P |
| | (c) Third batch of NaCl | G | F-FG | F-P |
| Example II | (a) First batch of NaCl | G | FG-G | F |
| Example III | (a) First batch of NaCl | G | G | F-FG |
| | (b) Second batch of NaCl | G | G | F-FG |
| Example IV | (a) First batch of NaCl | G | G | F-FG |

[1] G = Good; FG = fairly good; F = fair; P = poor; VP = very poor.

The results in Table I above demonstrate clearly the improved functional value of the treated salts of this invention. For reasons not clearly understood, those salts which were treated at a pH of about 8 to 12 were less detrimental to flavor than those which were treated in acid solutions.

Various procedures for the treatment of salt have been described in the literature. However, a comparison of the salts purified in the manner described in the literature with salts purified in the manner described aforesaid, demonstrate that the salts treated according to the prior art procedures are inoperative for the purposes intended in this invention. This is demonstrated in Table II below in which water margarines were prepared containing common salt of food grade quality to which was added sodium hexametaphosphate, and salt purified according to the aforementioned procedures. These water margarines were stored under air at 80° F. in half filled loosely capped jars. Flavor was evaluated at various times and the results given in Table II below:

even when the salt employed was of food grade quality and that a comparison of this salt with the control indicates that the difference in performance was very small. However, the above table also demonstrates that water margarines containing salts processed as hereinbefore described, are much superior to the premium salt of food grade quality with respect to eliminating the deleterious effects of salt on margarine flavor.

In another study, flavor stability of water margarines were tested using salt which had been treated in accordance with the manner specified heretofore versus water margarines prepared using the highest grade brine salt commercially available. Both salts contained by analysis substantially the same low iron and copper contents. However, the control reference salt had not been treated with the alkylenediaminetetracarboxylic acid component. The salt prepared according to the process described in this application had been crystallized from an alkaline brine solution containing the tetrasodium salt of EDTA. Both salts were produced on a plant scale in the very same plant and packed into 100 lb. bags. Both salts were analyzed for iron, copper and EDTA content according to

Table II

[Flavor stability of "Water" margarines made with 2.7% of salt in the product]

| Test Variables | Flavor [1] of Margarine under Air at 80° F. | | |
|---|---|---|---|
| | 0 Days | 3 Days | 8 Days |
| Control—Commercial salt (NaCl) of food-grade quality containing 1 p.p.m. of iron and 0.15 p.p.m. of copper | G | F-P | VP |
| Sodium hexametaphosphate added, 100 p.p.m. in terms of the margarine, equal to 3,700 p.p.m. in terms of the above NaCl present in the margarine | G | F-P | P |
| Salt of Example III used to provide the NaCl in making the margarine: | | | |
| (a) First batch of NaCl—no detectable EDTA or pro-oxidant metals present | G | G | F-FG |
| (b) Second batch of NaCl—no detectable EDTA or pro-oxidant metals present | G | G | F-FG |

[1] G = good; FG = fairly good; F = fair; P = poor; VP = very poor.

It will be seen from this table that the sodium hexametaphosphate was not satisfactory in eliminating the deleterious effect of iron and copper salts on margarine flavor the methods described heretofore. The functional value of the salts insofar as they affected the flavor stability of water margarines were evaluated according to the same procedures described heretofore. The results of these tests are set forth below in Table III.

Table III

[Characterization of salts used in preparing water margarines and flavor stability of the resulting margarines]

| Salt | Crystallization from Brine | Metal Content,[2] p.p.m. | | EDTA Content,[3] p.p.m. | Flavor of Margarines After 4 Days at 80° F.[4] |
|---|---|---|---|---|---|
| | | Iron | Copper | | |
| Regular food grade salt of highest quality. | No EDTA present | 0.4 | 0.5 | 0.0 | Very poor. |
| Salt of present invention,[1] Sample: | Tetrasodium salt of EDTA present in alkaline brine. | | | | |
| (a) | | 0.2 | 0.5 | <1.0 | Fair to fairly good. |
| (b) | | 0.4 | 0.5 | <1.0 | Fairly good. |
| (c) | | 0.3 | 0.3 | <1.0 | Fair to fairly good. |

[1] Produced on a plant scale and packed into 100 lb. bags and the salt periodically sampled during the bagging operation.
[2] According to the colorimetric procedures of Methods of Analysis, A.O.A.C., 8th Edition (1955).
[3] Colorimetric method of Darbey, Anal. Chem., 24, 373 (1952).
[4] Margarines containing 80% fat, 2.7% salt and the remainder water; these were stored under air at 80° F. in half-filled loosely capped jars.

A comparison of the results shown in the table above demonstrates that when the salt treated with the alkylenediaminetetracarboxylic acid component is incorporated into a high fat food such as water margarines, the flavor stability of the food is markedly improved. However, food grade salt of very high quality having substantially the same iron and copper contents as measured by the same tests as the salt processed in the manner heretofore described, impairs strikingly the flavor stability of water margarines. It will be seen that the margarine containing this salt scored very poor in flavor quality, the scoring being such as to indicate it to be repulsive in flavor quality and would be rejected by any consumer. On the other hand, salts containing relatively the same quantity of iron and copper, recrystallized from a brine solution of the alkylenediaminetetracarboxylic acid component provided margarines which scored fair to fairly good in flavor quality and thus would be completely acceptable to the consumer. In this particular series of tests, it should be noted that while the salt employed in both tests had substantially the same metal content present, in one case the metals functioned as pro-oxidants, where in the other case the metals were present in an innocuous form having been rendered so by treatment with the chelating agent.

The shelf life of products such as peanut butter are also materially enhanced when salt treated in accordance with the manner heretofore described are incorporated in the peanut butter rather than the conventional high grade premium salts usually employed. The effectiveness of the salts treated in the manner heretofore described relative to increasing the shelf life of peanut butter may be seen from the data contained in Table IV below. In this experiment, three portions of the same peanut butter was used; the peanut butter was prepared from ground Southwest Spanish peanuts and contained all additives. Regular food grade salt of highest quality was added to one portion; the second portion containing no salt at all was used as a control; and salt recrystallized from a brine containing an alkylenediaminetetracarboxylic acid component was added to the third portion. It will be noted that the iron and copper content of both salts were substantially the same, the difference between the two salt products being only that in one case the salt was obtained by crystallization from an alkaline brine containing the tetrasodium salt of EDTA. Both salts were free of any detectable EDTA component.

The peanut butter was obtained from one plant production batch and contained 50% fat, 46% non-fat peanut solids, 3% sugar and 1% salt when salt was added. These peanut butters were stored in clear glass jars for a period of three and one-half months at 75° F. under subdued light such as found in grocery stores. The results of these tests are shown in Table IV below.

Table IV

[Characterization of salts used in preparing peanut butters and flavor stability of the resulting peanut butters]

| Salt | Crystallization from Brine | Metal Content,[2] p.p.m. | | EDTA Content,[3] p.p.m. | Flavor of Peanut Butters After 3½ Months at 75° F.[4] |
|---|---|---|---|---|---|
| | | Iron | Copper | | |
| Regular food grade salt of highest quality. | No EDTA present | 0.4 | 0.5 | 0.0 | Very poor. |
| None added | | | | | Fair (Flat, because of absence of salt). |
| Salt of Present Invention [1] | Tetrasodium salt of EDTA present in alkaline brine. | 0.3 | 0.4 | <1.0 | Fair. |

[1] Produced on a plant scale in the same plant and from the same brine source as the control regular salts.
[2] According to the colorimetric procedures of Methods of Analysis, A.O.A.C., 8th Edition (1955).
[3] Colorimetric method of Darbey, Anal. Chem., 24, 373 (1952).
[4] Peanut butter containing 50% fat, 46% non-fat peanut solids, 3% sugar, and 1% salt; these were stored in clear glass jars for 3½ months at 75° F. under subdued light such as found in grocery stores.

It will be noted from Table IV above that the peanut butter made with the control reference salt of highest quality, scored very poor in flavor after the holding period. It was rancid in both flavor and odor. The control peanut butter made without added salt scored fair in flavor. It was flat because of the absence of salt. Other than for that, it was acceptable in flavor. The peanut butter made with the salt recrystallized from the solution containing the tetrasodium salt of the alkylenediaminetetracarboxylic acid, was fair in flavor and was superior to that made without the salt since it was not flat in flavor. A score of fair means that most consumers would find the peanut butter acceptable in home use. Again it should be noted that while the salt treated with the chelating agent contained iron and copper in minute quantities, the salt exhibited no pro-oxidant tendencies since the flavor stability of the peanut butter was equal to that of the product made without any added salt whatsoever.

Peanut butter is a product which does not contain an aqueous phase. Thus the product does not benefit by the addition of the alkylenediaminetetracarboxylic acid component directly to the product since there is no opportunity for the salt and the chelating agent to get together in the absence of an aqueous phase. Under such circumstances, the peanut butter will exhibit a flavor stability no better than that made with the regular salt of the highest quality without the added alkylenediaminetetracarboxylic acid component. Food products which do not contain an aqueous phase such as peanut butter or potato chips, etc. may be protected however against flavor deterioration due to the pro-oxidant metals in salt by first recrystallizing the salt from an alkaline brine solution containing an alkylenediaminetetracarboxylic acid component prior to incorporating the salt in the product. The simple combination of salt with a dry EDTA component for such products is without benefit.

Having thus provided a written description of my invention, it should be understood that the appended claims define the scope thereof.

What is claimed is:

1. In a salted food product containing at least about 15% fat, the improvement comprising having present therein food grade sodium chloride which has been obtained by evaporation of up to 95% by weight of the water in a brine and containing in solution about 50 to 5,000 p.p.m. of an alkylenediaminetetracarboxylic acid compound, such residual pro-oxidant trace metals as remain in said sodium chloride being in chelated form said sodium chloride being free of the uncombined alkylenediaminetetracarboxylic acid compound.

2. In a margarine having a fat content of about 80%, the improvement comprising having present therein about 1 to 4% by weight of food grade sodium chloride which has been obtained by evaporation of up to 95% by weight of the water in a brine and containing in solution about 50 to 5,000 p.p.m. of an an alkylenediaminetetracarboxylic acid compound, such residual pro-oxidant trace metals as remain in said sodium chloride being in chelated form said sodium chloride being free of the uncombined alkylenediaminetetracarboxylic acid compound.

3. In a peanut butter having a fat content of about 50%, the improvement comprising having present therein food grade sodium chloride which has been obtained by evaporation of up to 95% by weight of the water in a brine and containing in solution about 50 to about 5,000 p.p.m. of an alkylenediaminetetracarboxylic acid compound, such residual pro-oxidant trace metals as remain in said sodium chloride being in chelated form said sodium chloride being free of the uncombined alkylenediaminetetracarboxylic acid compound.

4. The method of protecting a salted food product containing at least about 15% fat against the development of off-flavors originating in the fat that are caused by pro-oxidant trace metals in the salt which comprises adding to said food product food grade sodium chloride which has been obtained by evaporation of up to 95% by weight of the water in a brine and containing in solution about 50 to about 5,000 p.p.m. of an alkylenediaminetetracarboxylic acid compound, such residual pro-oxidant trace metals as remain in said sodium chloride being in chelated form said sodium chloride being free of the uncombined alkylenediaminetetracarboxylic acid compound.

5. The method of protecting a salted margarine having a fat content of about 80% against development of off-flavors originating in the fat that are caused by pro-oxidant trace metals in the salt which comprises incorporating in said margarine about 1–4% of food grade sodium chloride which has been obtained by evaporation of up to 95% by weight of the water in a brine and containing in solution about 15 to about 5,000 p.p.m. of an alkylenediaminetetracarboxylic acid compound, such residual pro-oxidant trace metals as remain in said sodium chloride being in chelated form said sodium chloride being free of the uncombined alkylenetetracarboxylic acid compound.

6. The method of protecting a peanut butter containing salt and having a fat content of about 50% against development of off-flavors originating in the fat that are caused by pro-oxidant trace metals in the salt which comprises incorporating in said peanut butter food grade sodium chloride which has been obtained by evaporation of up to 95% by weight of water in a brine and containing in solution about 50 to about 5,000 p.p.m. of an alkylenediaminetetracarboxylic acid compound, such residual pro-oxidant trace metals as remain in said sodium chloride being in chelated form said sodium chloride being free of the uncombined alkylenetetracarboxylic acid compound.

7. In a salted food product according to claim 1, the improvement comprising obtaining said sodium chloride from a brine having a pH of between 8 to about 12.

8. In a margarine according to claim 2, the improvement comprising obtaining said sodium chloride from a brine having a pH of between 8 to about 12.

9. In a peanut butter according to claim 3, the improvement comprising obtaining said sodium chloride from a brine having a pH of between 8 to about 12.

10. The method of protecting a salted food product according to claim 4 which comprises obtaining said sodium chloride from a brine having a pH of between 8 to about 12.

11. The method of protecting margarine according to claim 5 which comprises obtaining said sodium chloride from a brine having a pH of between 8 to about 12.

12. The method of protecting peanut butter according to claim 6 which comprises obtaining said sodium chloride from a brine having a pH of between 8 to about 12.

References Cited by the Examiner

UNITED STATES PATENTS

| 2,108,783 | 2/1938 | Smith | 23—89 |
| 2,645,581 | 7/1953 | Robison | 99—143 |
| 2,668,771 | 2/1954 | Hall | 99—222 |
| 2,681,287 | 6/1954 | Starr | 99—159 X |
| 2,707,154 | 4/1955 | Lehmann et al. | 99—163 |
| 2,754,213 | 7/1956 | Jones et al. | 99—123 |

FOREIGN PATENTS 779,742  7/1957  Great Britain.

OTHER REFERENCES

Scientific American: vol 188, No. 6, June 1953, page 70.
Technical Bulletin No. 2: (1950), Bersworth Chemical Co., Framingham, Mass., Section 1, pp. 1–8 and Section 2, pp. 44 and 45, 48 and 49.

A. LOUIS MONACELL, *Primary Examiner.*

M. W. GREENSTEIN, *Assistant Examiner.*

UNITED STATES PATENT OFFICE
CERTIFICATE OF CORRECTION

Patent No. 3,243,302                                March 29, 1966

Daniel Melnick

It is hereby certified that error appears in the above numbered patent requiring correction and that the said Letters Patent should read as corrected below.

Column 3, line 62, strike out "as"; column 5, line 8, for "the" read -- for --; column 12, lines 11 and 24, for "alkylenetetracarboxylic", each occurrence, read -- alkylenediaminetetracarboxylic --.

Signed and sealed this 31st day of January 1967.

(SEAL)
Attest:

ERNEST W. SWIDER
Attesting Officer

EDWARD J. BRENNER
Commissioner of Patents